US005819303A

United States Patent [19]
Calhoun

[11] Patent Number: 5,819,303
[45] Date of Patent: Oct. 6, 1998

[54] INFORMATION MANAGEMENT SYSTEM WHICH PROCESSES MULTIPLE LANGUAGES HAVING INCOMPATIBLE FORMATS

[75] Inventor: John K. Calhoun, Felton, Calif.

[73] Assignee: Apple Computer, Inc., Cupertino, Calif.

[21] Appl. No.: 954,084

[22] Filed: Oct. 20, 1997

Related U.S. Application Data

[63] Continuation of Ser. No. 751,562, Nov. 18, 1996, abandoned, which is a continuation of Ser. No. 312,979, Sep. 30, 1994, abandoned.

[51] Int. Cl.$^6$ ...................................................... G06F 3/14
[52] U.S. Cl. .............................................. 707/536; 704/8
[58] Field of Search ................................... 704/1, 2, 7, 8; 707/513, 517, 523, 524, 529, 530, 531, 535, 536

[56] References Cited

U.S. PATENT DOCUMENTS 4,566,078   1/1986   Crabtree ............................ 364/419.01

OTHER PUBLICATIONS

News Release; Dateline: Cupertino, CA; Dec. 13, 1993; "Apple Launches New Version of HyperCard"; Dialog: File 621, Acc#0469284.
Hall, William S; Adapt Your Program for Worldwide Use with Windows Internationalization Support; Microsoft Systems Journal, Nov./Dec. 1991 pp. 29–58.
Petzold, Charles, Programming Windows, Second Edition, 1990 pp. 123–131 (Chapter 3 the Keyboard).
HyperCard Script Language Guide, 1989–1990, pps. 1, 15–20, 315, 326–328 and 366.
Becker; "Multilingual Word Processing"; Scientific American; v251, p.96(12); Jul., 1984; Dialog: File 47, Acc#02578867.
Said; "Apple Joins Quest for Universal character Standard: with 16 bits, Code Will Include All Languages, Symbols"; MacWeek; v5 n8, p.5(1); Feb. 26, 1991; Dialog: File 275, Acc#01419060.
"Special Report: Encoding: Unicode Availability of Multilingual Text & Character Encoding Standard"; Edge: Work–Goup Computing Report; v2 70; p17(1); Sep. 23, 1991; Dialog: File 275, Acc#01455253.
Said; "QuickDraw GX Will Add Portability to Mac Documents"; MacWeek; v6, n20,p.1(2); May 18, 1992; Dialog: File 148, Acc#05870289.
"Unicode Consortium Announces Multilingual Standards Merger; Uniform Character Standard Simplifies Internationalization"; PR Newswire, 0701A5439; Jul. 1, 1992; Dialog: File 148, Acc#06079832.

(List continued on next page.)

*Primary Examiner*—Stephen R. Tkacs
*Attorney, Agent, or Firm*—Burns, Doane, Swecker & Mathis, L.L.P.

[57] ABSTRACT

A computer performs designated operations on text that can be in any of a variety of different languages, rather than being restricted to a single language for which the computer was designed. A library stores operators and functions that can act upon character strings. Also stored within the library are sets of rules which identify the casing, ordering and matching of characters within different writing systems, or human languages. When a user of the computer designates a particular operation to be performed with respect to a text string, the writing system associated with the text string is identified. This identification can be made with reference to the typefont that is used to display the text string. Once the writing system for a string has been determined, appropriate tables and data structures that define and encode language rules for that writing system are accessed and applied to the operation on the string. For example, when comparing strings of text, the computer will be instructed whether to compare encodings on the basis of one byte at a time or multiple bytes together.

27 Claims, 3 Drawing Sheets

OTHER PUBLICATIONS

Swartz; "Multinationals Await World Script Debut"; MacWeek; v6, n32, p147(1); Sep. 14, 1992; Dialog: File 148, Acc#06130043.

"Apple Widens World View"; MacWeek; v6, n33, p.42(1); Sep. 21, 1992; Dialog: File 148, Acc#06127515.

Ford et al.; "Apple's New Technology and Publishing Strategies"; MacWeek; v6, n34, p.38(4); Sep. 28, 1992; Dialog: File 275, Acc#01536925.

Picarille; "WorldPerfect Learns Japanese with WorldScript World Processor"; MacWeek; v6, n43, p.15(1); Dec. 7, 1992; Dialog: File 148, Ac#06179531.

McManus; "Apple Show to Go Global with WorldScript Tools"; MacWeek; v7, n4, p.1(2); Jan. 25, 1993; Dialog: File 275, Acc#01581939.

INFORMATION MANAGEMENT SYSTEM WHICH PROCESSES MULTIPLE LANGUAGES HAVING INCOMPATIBLE FORMATS

This application is a continuation of application Ser. No. 08/751,562 filed Nov. 18, 1996, now abandoned, which is a continuation of application Ser. No. 08/312,979, filed Sep. 30, 1994 now abandoned.

FIELD OF THE INVENTION

The present invention is directed to information management systems that are employed in computers, and more particularly to an information management system that enables operations to be performed on text where the text may be in any one of a number of different languages having incompatible rules of structure.

BACKGROUND OF THE INVENTION

A variety of application programs and tools are available for use on computers to enable users to manage large amounts of related information. For example, relational data bases permit users to store, recall, edit and otherwise manipulate various items of information, and to present that information in any of a number of desirable formats. Another example of an information management tool is HyperCard®, distributed by Apple Computer, Inc. of Cupertino, Calif. In this application, each item of information is stored in a fundamental data structure known as a card, and a number of cards can be grouped together into stacks on the basis of common subject matter. Various cards and stacks can be linked to one another in any desirable manner, to permit the user to navigate through the information in a variety of different ways. Further examples of information management systems include application programs having macro languages that provide the user with the ability to manipulate text.

Information management systems of the type to which the present invention is directed allow the users to perform operations related to the information being managed. For example, in a data base program, the user can issue a command to sort all records according to the value stored in a particular field, and to retrieve all records in which the information in a particular field contains a first value but not a second value. In a similar manner, the HyperCard® application permits a user to designate operators and functions that are to be performed upon elements of text strings, i.e., characters, words, items or lines in a string of text. For example, the user might request the program to find all cards in which a particular target word is contained in a string of text, or to count the number of words in a string of text.

In the past, computers have been set up to carry out operations of this type in accordance with the rules for casing, ordering and matching of characters that are associated with a particular language. For example, computers intended for sale in the Western Hemisphere and in Europe typically operate in accordance with the rules of Roman languages, such as English, French and the like. Computers that are destined to be used in Eastern Asian countries might operate according to the rules of Japanese or Chinese writing systems. Furthermore, computers that are intended for operation in the Arabic countries may employ yet another set of rules for interpreting the elements of textual strings.

In many instances, the rules of structure that are employed for one type of writing system are different from those employed in another type of writing system. For example, in the Roman languages, each character and symbol is represented in a computer by one byte of information. In contrast, because of the much larger number of characters contained in Japanese and Chinese alphabets, each character in these alphabets is typically represented by two or more bytes of information. This type of difference can present a problem when performing operations upon characters. For example, a user may issue a command which requires the computer to compare two different text strings and determine whether they are equal. In carrying out this function, the computer does not recognize and compare the characters of the text string themselves. Rather, it compares the numerical encodings of the characters. For example, the two characters "ä and φ" are respectively encoded as 138 191 in at least one type of computer system, where the code for each character occupies one byte of memory. In this computer system this same two-byte encoding also represents the first Kanji character of the Japanese word "Kanji". As a result, if a computer is operating in accordance with the rules of Roman languages only, it will erroneously determine that the expression "äφ" is the same as the Japanese Kanji character, since both have the same encoding.

This difference between the two writing systems also presents problems in connection with the use of commands. For example, each time a backspace key on a keyboard is depressed, it causes the character immediately preceding a displayed cursor to be deleted. In a computer which operates in accordance with the rules pertaining to Roman languages, the depression of the backspace key causes one byte of information to be deleted. If, however, the text which is to be deleted is in a different language which employs two bytes per character, each depression of the backspace key would remove only half of the encoding for the character, and could result in meaningless information being displayed on the computer's screen.

In a similar manner, a computer which operates on the basis of Roman languages for its default script system may attempt to improperly wrap fields that contain Japanese Kanji characters.

The number of bytes that are used to represent a character is not the only difference that presents problems when performing operations on strings of text. As another example, a command may require a computer to parse a string into its constituent elements, for example to parse a sentence into words. In the English language, words are divided by spaces, and therefore the exercise of parsing an English phrase into words involves scanning for character encodings for spaces. However, in other forms of writing, such as traditional Japanese writing and early medieval calligraphy, spaces are seldom or never used between words. Rather, the human reader applies contextual rules and a knowledge of the vocabulary to divide the text into words. If an attempt is made by a computer to parse these types of writings using the standard rules for English, the computer could erroneously conclude that an entire document consists of a single word.

Accordingly, it is desirable to provide a system which enables a computer to perform operations on text that might be associated with any of a variety of different types of writing systems.

BRIEF DESCRIPTION OF THE INVENTION

In accordance with the present invention, a computer can perform designated operations on text that is presented in any of a variety of different languages, rather than being restricted to operations that are carried out in accordance with the single language for which the computer was configured. A string manipulation library within the computer stores operators and functions that can act upon character strings. Also stored within the library are sets of rules pertaining to different writing systems, or human languages. When a user of the computer designates a particular operation to be performed with respect to a text string, the writing system associated with the text string is identified. For example, this identification can be made with reference to the typefont that is used to display the text string. Once the writing system for a string has been determined, appropriate tables and data structures that define and encode language rules for that writing system are accessed and applied to the operation on the string. Thus, for example, when comparing strings of text, the computer will be instructed whether to compare encodings on the basis of one byte at a time or multiple bytes together.

With this type of system, a computer can perform operations that are appropriate for the language of an input string, regardless of the base configuration of the system software upon which it runs. The string manipulation library treats each string in accordance with the rules of its particular language, rather than the base language for which the system software was designed. As such, any given information management system can be ported to different countries of the world, and used within different parts of a multi-national corporation.

Further features of the invention, as well as the advantages offered thereby, are explained in detail hereinafter with specific reference to preferred embodiments illustrated in the accompanying drawings.

DETAILED DESCRIPTION

The present invention pertains to a system and method which enables an information management system of a computer to perform operations on text strings in a manner that is consistent with the rules of structure for any of a number of different writing systems that may be associated with the text string. While the particular hardware components of a computer do not form a part of the invention itself, they are briefly described herein to provide a thorough understanding of the manner in which the features of the invention cooperate with the components of a computer to produce the desired results. Furthermore, to facilitate an understanding of the features and operation of the invention, specific references may be made hereinafter to the implementation of the invention within a particular information management system, such as the HyperCard® program distributed by Apple Computer, Inc. It will be appreciated, however, that the practical applications of the invention are not limited to the particular disclosed embodiments. Rather, the invention will find utility in any type of information management system which provides the ability to store, retrieve and display textual data, and which performs programmable operations on that data.

Figure 1:
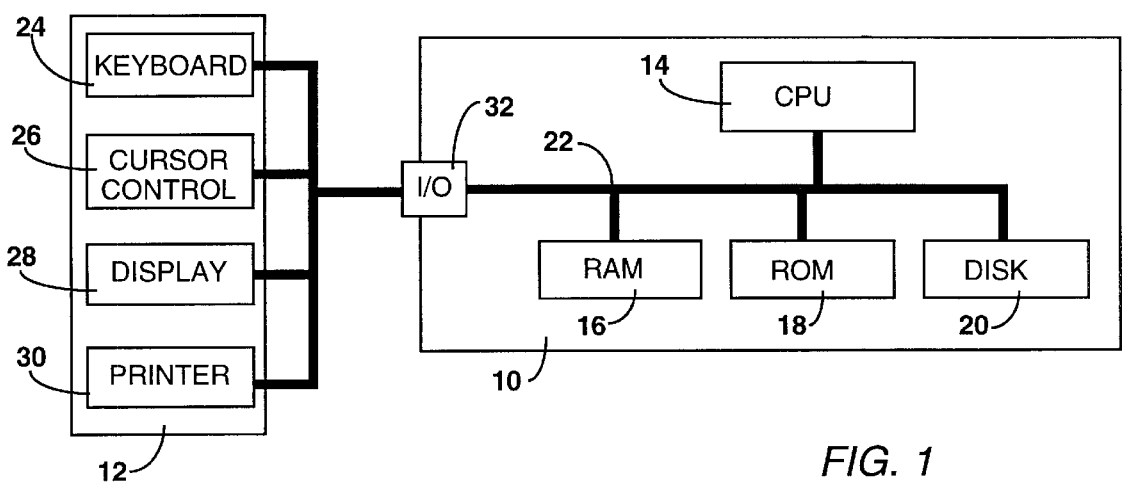
FIG. 1 is a general block diagram of the hardware for a typical computer of the type on which the present invention can be used.

Referring to FIG. 1, a typical computer system of the type in which the present invention can be employed includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26, such as a mouse, trackball, pen or the like. A display device 28, such as a CRT monitor or an LCD screen, provides a visual display of the information that is being processed within the computer, for example the contents of a document or a computer-generated image. A hard copy of this information can be provided through a printer 30, or similar such device. Each of these external peripheral devices communicates with the CPU 14 by means of one or more input/output ports 32 on the computer.

Although not illustrated in FIG. 1, the computer system may comprise a workstation, or client, in a computer network. In such a case, the computer 10 typically communicates with a central server that stores additional information for access by the computer.

An information management system of the type in which the present invention can be employed might be stored in the computer 10 on its disk 20, and loaded into the RAM 16 at the time it is to be used. Since information management systems are well known in themselves, a detailed discussion of their operation will not be presented herein. Generally speaking, an information management system may specify or include libraries of operators and functions that act upon character strings. Examples of typical operators that might be found in such a system are set forth in Table 1, and examples of typical functions are identified in Table 2 below.

TABLE 1

| OPERATOR | EXAMPLE | RESULT TYPE |
| --- | --- | --- |
| equality | "AB" is "ab" | boolean |
| inequality | "AB" is not "Aa" | boolean |
| comparison | "A" < "B" | boolean |
| containment | "Apple" contains "A" | boolean |
| membership | "A" is in "Apple" | boolean |
| concatenation | "A" & "B" | string |

TABLE 2

| FUNCTION | EXAMPLE | RESULT TYPE |
| --- | --- | --- |
| parsing into elements | word 1 of string | string |
| counting of elements | number of words in string | numeric |
| insertion of elements | put "!" after word 1 of string | string |
| deletion of elements | delete word 2 of string | string |
| sorting of elements | sort items of string by key | string |
| conversions between character representation and character encoding | numToChar(32) charToNum("A") | string numeric |
| searching | find target in string | reference |
| date and time conversions | convert string to date convert string to time | string string |

In accordance with the present invention a library of such operators and functions adapts itself to the human language or languages in which the input strings are intended to be interpreted. More particularly, the functions respect not only the encoding of characters within the strings, but also employ the rules for casing, ordering and matching of characters that are defined by the human languages associated with the strings. To this end, the information management system includes a number of sets of rules, where each set of rules pertains to the structure of a specific language or writing system. For example, the set of rules relating to English or other Roman languages might identify the fact that each character is represented by one byte of information, and each word is separated by a space symbol. Other rules might pertain to the casing of characters, for example "A" is equivalent to "a", as well as the alphabetical ordering and the matching of characters.

Figure 2:
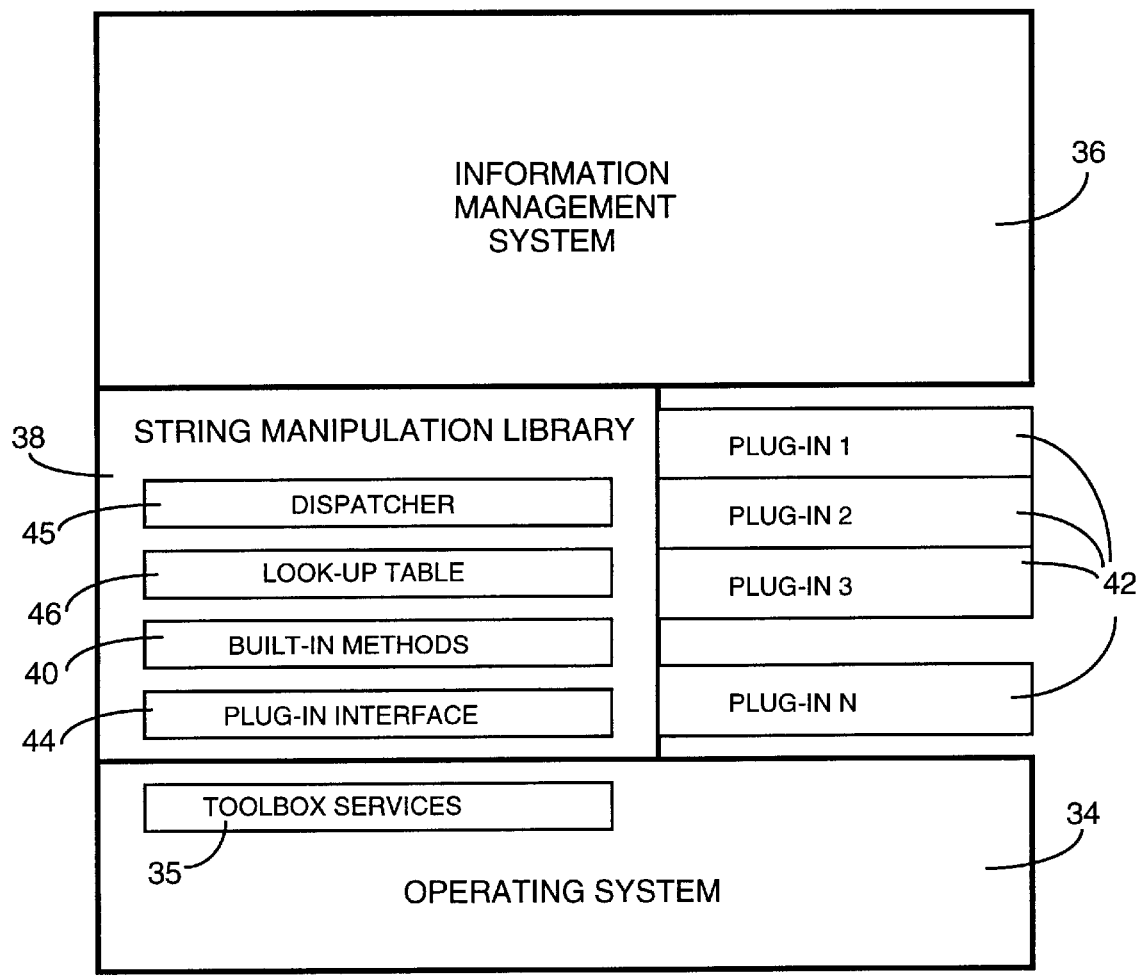
FIG. 2 is a block diagram of the architecture of a computer system incorporating the principles of the present invention.

The architecture of a computer software system which implements the principles of the present invention is illustrated in FIG. 2. Referring thereto, the computer includes an operating system 34 which controls the basic operations of the computer. Generally speaking, the operating system functions as an interface between the hardware components of the computer and application programs running on the computer. Various types of functionality, referred to as toolbox services 35, can be associated with the operating system to carry out certain specific functions during the operation of the computer. For example, one toolbox service might be a routine that converts a date between different formats. Other such services might include those for conversion between binary and textual forms of numbers, and access to tables that define language rules such as the sorting order of characters, lowercasing, lists of separators and the like.

An information management system 36 can be any suitable application program running on the computer. Examples of such an information management system include a relational database program or the HyperCard® program mentioned previously. Operating in a well known manner, the information management system interacts with the computer's operating system to enable the user to store, recall, and manipulate data.

Associated with the information management system is a string manipulation library 38. This library includes the functionality that carries out the operations and functions set forth in Tables 1 and 2 above. Also included within the library are sets of rules pertaining to the structure of various writing systems. Some of these sets of rules can include built-in methods 40 that are incorporated into the structure of the library itself. For example, some of the built-in methods can comprise operations and functions pertaining to the specific language for which the computer is designed. If the computer is intended to be used in Europe, for example, the built-in methods might include the sets of operations and functions for all of the Roman languages that are spoken in Europe.

In addition to the built-in sets of rules, the library also accommodates additional sets of rules that can be loaded into the system by way of plug-in modules 42. For example, a computer that was designed for use in Europe may include a built-in string matching function that is suitable for both Roman and Japanese writing systems. If the user of that computer also desires to manipulate Arabic text, he might add a plug-in module that includes the functions and operations necessary for Arabic string matching, and perhaps that of other languages as well. To enable these plug-in sets of operations and functions to be accessed, the library includes a plug-in interface 44 that communicates with each of the plug-in modules and loads them into the computer's memory as needed.

For a computer to perform language-sensitive string operations, it must be capable of identifying the human language, or writing system, by which its input text string is to be interpreted. In one embodiment of the present invention, the identification of the writing system pertaining to an input string can be obtained from the typefont that is used to display the characters. Typically, typefonts have identification numbers that are grouped according to writing system. For example, Roman-language typefonts may have identification numbers ranging from 0 to n, Arabic typefonts may range from (n+1) to (n+x), and so on. When a text string to be operated upon is entered, its typefont identification number is detected. Using this number and the requested operation or function, a dispatcher 45 within the library refers to a lookup table 46 and determines whether to invoke a built-in operation, a toolbox service, or a plug-in module to carry out the operation or function. Thus, in the example given previously, if string-matching is requested for Roman-language text, a built-in function 40 would be called, but if the function is requested with respect to Arabic text, the dispatcher would invoke one of the plug-in modules 42 to carry out the operation.

In some cases, it is possible that both a plug-in module and a built-in set of rules will be available for a particular writing system. In such a case, it is preferable to employ the set of rules from the plug-in module, since it is assumed that the user has added this module to the computer with the intent that those rules be employed. Alternatively, the user might be presented with a choice, so that the desired set of rules to be employed in any given situation can be selected.

It is possible to identify the writing system associated with an input string by means of information other than the typefont. For example, the writing system might be explicitly specified by the user, or obtained from the source of the string, such as the file or data structure that stores it, or inferred from the method used to input this string, such as a special program that is used to enter idiographic characters.

Figure 3:
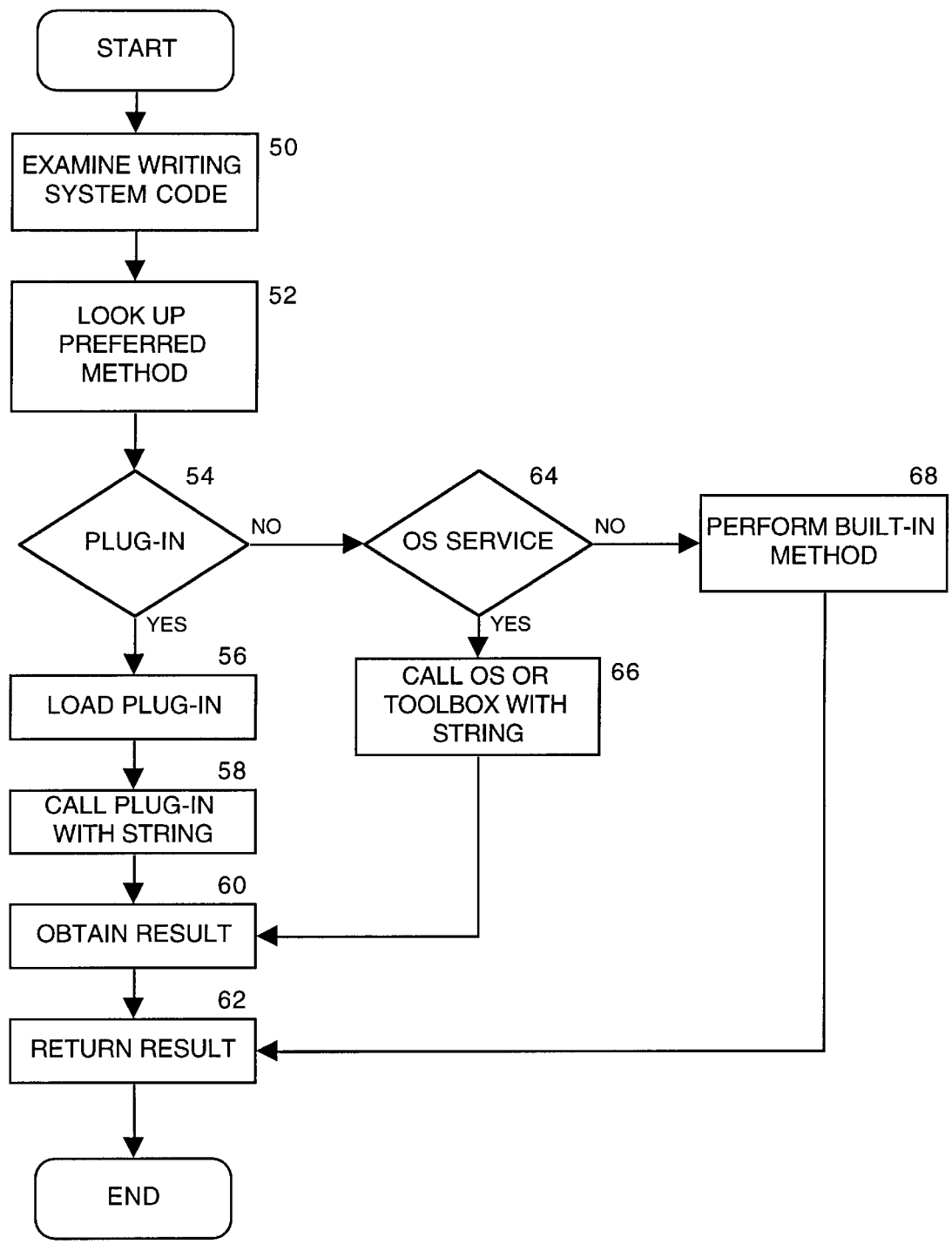
FIG. 3 is a flowchart of the operation of the system for a unary string manipulation function.

FIG. 3 illustrates a flowchart that describes the operation of the string manipulation library. The specific example illustrated in this flowchart pertains to unary operations in which there is only one input string, such as sorting, counting or parsing. In these types of operations, the rules of only one writing system are considered. Referring to FIG. 3, when a function to be performed on a text string is specified by the user, the string manipulation library first examines the writing system code for the input string (Step 50). For example, as noted previously, the writing system may be determined from the typefont that is used to display the text. Given this information, the system looks up the preferred method for the identified writing system, as set forth in the look-up table 46 (Step 52). A determination is then made, at Step 54, whether the preferred method is present as a plug-in module. If so, the module is loaded into the computer's memory (Step 56), and the specified function is called, with the text string as an input value (Step 58). The module returns a value that is obtained at Step 60 and provided to the information management system at Step 62.

If the determination at Step 54 was that the preferred method was not a plug-in module, a decision is made at Step 64 whether the desired function is an operating system or toolbox service. If so, the function is called from the operating system or its toolbox with the input string (Step 66). After the result is obtained at Step 60, it is returned to the information management system at Step 62. If the desired function was not present in a plug-in module and also was not available as an operating system or toolbox service, one of the built-in methods from the string manipulation library is carried out, and the result from this method is returned to the information management system.

If a binary operation is to be performed, such as equality or comparison, for example, it is possible that the two input strings might be in different respective langauges. In such a case, the string manipulation library interprets each text string according to its applicable rules. For example, if the characters "аφ" in a Roman language are to be compared to the Japanese Kanji character having the same encoding, the string manipulation library will recognize that two one-byte characters are not the same as a two-byte character, and therefore return a value of false, i.e. no match, even though the encodings are the same.

From the foregoing, it can be seen that the present invention provides an information management system that performs operations on text strings that are appropriate for the language of the text, regardless of the base language for which the computer system was designed. In other words, each text string is processed in accordance with the intrinsic rules that were used in the original creation of the text, rather than those for which the computer was configured. Thus, users are able to manipulate and perform operations on a variety of types of text, rather than being limited to operations within a single writing system.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims rather than the foregoing description, and all changes that come within the meaning and range of equivalence thereof are intended to be embraced therein.

What is claimed is:

1. In a computer, a system for providing multi-lingual capabilities for operations performed on text, comprising:
   a memory storing a plurality of sets of rules which respectively pertain to the structure of different writing systems;
   means for designating an operation to be performed upon text;
   means for identifying, on the basis of the text upon which the designated operation is to be performed, the writing system associated with said text;
   means for accessing the stored set of rules which pertain to the identified writing system; and
   means for performing the designated operation in accordance with the accessed set of rules.

2. The system of claim 1 wherein said identifying means comprises means for determining a typefont associated with the text upon which the designated operation is to be performed, and means for identifying a writing system associated with the determined typefont.

3. The system of claim 1 wherein at least one of said sets of rules is incorporated within the operating system software for the computer.

4. The system of claim 3 wherein another one of said sets of rules is contained in a plug-in module separate from the operating system, and wherein said accessing means includes an interface for providing access to said plug-in module.

5. The system of claim 1 wherein at least one of the rules in a set identifies a format in which characters of an associated writing system are encoded.

6. The system of claim 5 wherein said one rule identifies whether characters are encoded in a single byte of data or multiple bytes of data.

7. A method for performing operations on text in a computer, where the text can be associated with any one of a plurality of different writing systems, comprising the steps of:

storing a plurality of sets of rules which respectively pertain to the structure of different writing systems;
designating an operation to be performed upon text;
identifying, on the basis of the text upon which the designated operation is to be performed, the writing system associated with said text;
accessing the stored set of rules which pertain to the identified writing system; and
performing the designated operation in accordance with the accessed set of rules.

8. The method of claim 7 wherein said identifying step comprises the steps of determining a typefont associated with the text upon which the designated operation is to be performed, and identifying a writing system associated with the determined typefont.

9. The method of claim 7 wherein at least one of the rules in a set identifies a format in which characters of an associated writing system are encoded.

10. The method of claim 7 wherein said one rule identifies whether characters are encoded in a single byte of data or multiple bytes of data.

11. The method of claim 5 wherein said accessing step comprises the steps of determining whether applicable rules for the identified writing system are present in an operating system function, a character string manipulation library or a plug-in module separate from the operating system, and accessing the rules from an appropriate one of these three sources.

12. The method of claim 11 wherein the rules are accessed from a plug-in module if they are determined to be present therein.

13. An information management system for a computer having multi-lingual capabilities, comprising:
   a library of operators and functions that are carried out by the computer to manipulate strings of test, said library containing a first set of operators and functions that pertain to text in a base writing system for which the computer is configured, and a second set of operators and functions that pertain to text in a writing system other than said base writing system;
   means for receiving user-entered requests to perform text manipulation operations on text strings;
   means for detecting the writing system associated with a text string entered by user, on the basis of said text string itself;
   means responsive to the detected writing system and the requested operation for selecting one of said sets of operators and functions and for invoking the selected set to perform the requested operation in the text string.

14. The information management system of claim 13, wherein said library includes an interface which provides access to sets of operators and functions that are contained in modules separate from said library, and said selecting means includes a dispatcher for determining whether a set of operators and functions for performing a requested operation on a text string is present in said library or in a separate module, and for invoking the determined set to perform the requested operation.

15. The information management system of claim 14 wherein said dispatcher also determines whether operators or functions for performing requested operations on a text string are present in the operating system of the computer, and for invoking the operating system to perform the requested operation.

16. The information management system of claim 13 wherein said detecting means determines the associated writing system on the basis of a typefont that is used to display the text of an input text string.

17. A computer-readable medium containing:
a plurality of sets of rules which respectively pertain to the structure of different writing systems, and
a computer program which executes the following steps:
receiving an indication of an operation to be performed upon designated text;
automatically identifying the writing system associated with the designated text upon which the indicated operation is to be performed, on the basis of said designated text;
accessing the stored set of rules which pertain to the identified writing system; and
performing the designated operation in accordance with the accessed set of rules.

18. The computer-readable medium of claim 17 wherein said identifying step is executed by automatically determining a typefont associated with the designated text upon which the indicated operation is to be performed, and identifying a writing system associated with the determined typefont.

19. The computer-readable medium of claim 17 wherein at least one of said sets of rules is contained in a plug-in module stored on said medium, and said medium further includes an interface for providing access to said plug-in module.

20. An information management system contained in a computer-readable medium, for use in a computer having multi-lingual capabilities, comprising:
a library of operators and functions that are carried out by the computer to manipulate strings of text, said library containing a first set of operators and functions that pertain to text in a base writing system for which the computer is configured, and a second set of operators and functions that pertain to text in a writing system other than said base writing system; and
an executable set of computer instructions which perform the functions of receiving user-entered requests to perform text manipulation operations on designated strings of text; automatically detecting the writing system associated with a text string designated by a user, on the basis of said designated text string; selecting one of said sets of operators and functions in response to the detected writing system and the requested operation; and invoking the selected set to perform the requested operation on the designated text string.

21. The information management system of claim 20, wherein said computer-readable medium further includes an interface which provides access to sets of operators and functions that are contained in modules separate from said library, and a dispatcher for determining whether a set of operators and functions for performing a requested operation on a text string is present in said library or in a separate module, and for invoking the determined set to perform the requested operation.

22. The information management system of claim 21 wherein said dispatcher also determines whether operators or functions for performing requested operations on a text string are present in the operating system of the computer, and for invoking the operating system to perform the requested operation.

23. The information management system of claim 20 wherein the associated writing system is automatically detected by determining a typefont that is used to display the text of an input text string.

24. A system for providing multi-lingual capabilities for operations performed on text in a computer, comprising:
a memory storing a plurality of sets of rules which respectively pertain to the structure of different writing systems;
an input mechanism which receives a command for an operation to be performed upon designated text;
a recognition mechanism which identifies the writing system associated with the designated text upon which the commanded operation is to be performed;
a retrieval mechanism which accesses the stored set of rules which pertain to the identified writing system; and
an execution system which performs the designated operation in accordance with the accessed set of rules.

25. The system of claim 24 wherein said recognition mechanism comprises a software module which determines a typefont associated with the designated text upon which the commanded operation is to be performed, and identifies a writing system associated with the determined typefont.

26. The system of claim 24 wherein at least one of said sets of rules is incorporated within the operating system software for the computer.

27. The system of claim 26 wherein another one of said sets of rules is contained in a plug-in module separate from the operating system, and wherein said retrieval mechanism includes an interface for providing access to said plug-in module.

* * * * *

UNITED STATES PATENT AND TRADEMARK OFFICE
CERTIFICATE OF CORRECTION

PATENT NO. : 5,819,303
DATED : October 6, 1998
INVENTOR(S) : John K. Calhoun

It is certified that error appears in the above-identified patent and that said Letters Patent is hereby corrected as shown below:

In the claims:

Claim 11, column 8, line 23, "claim 5," should read --claim 7,--

Signed and Sealed this

Thirteenth Day of July, 1999

*Attest:*

Q. TODD DICKINSON

*Attesting Officer*      *Acting Commissioner of Patents and Trademarks*